Sept. 15, 1942. W. J. BRETH 2,295,541
APPARATUS FOR FORMING FABRIC BANDS
Filed July 6, 1938 5 Sheets-Sheet 1
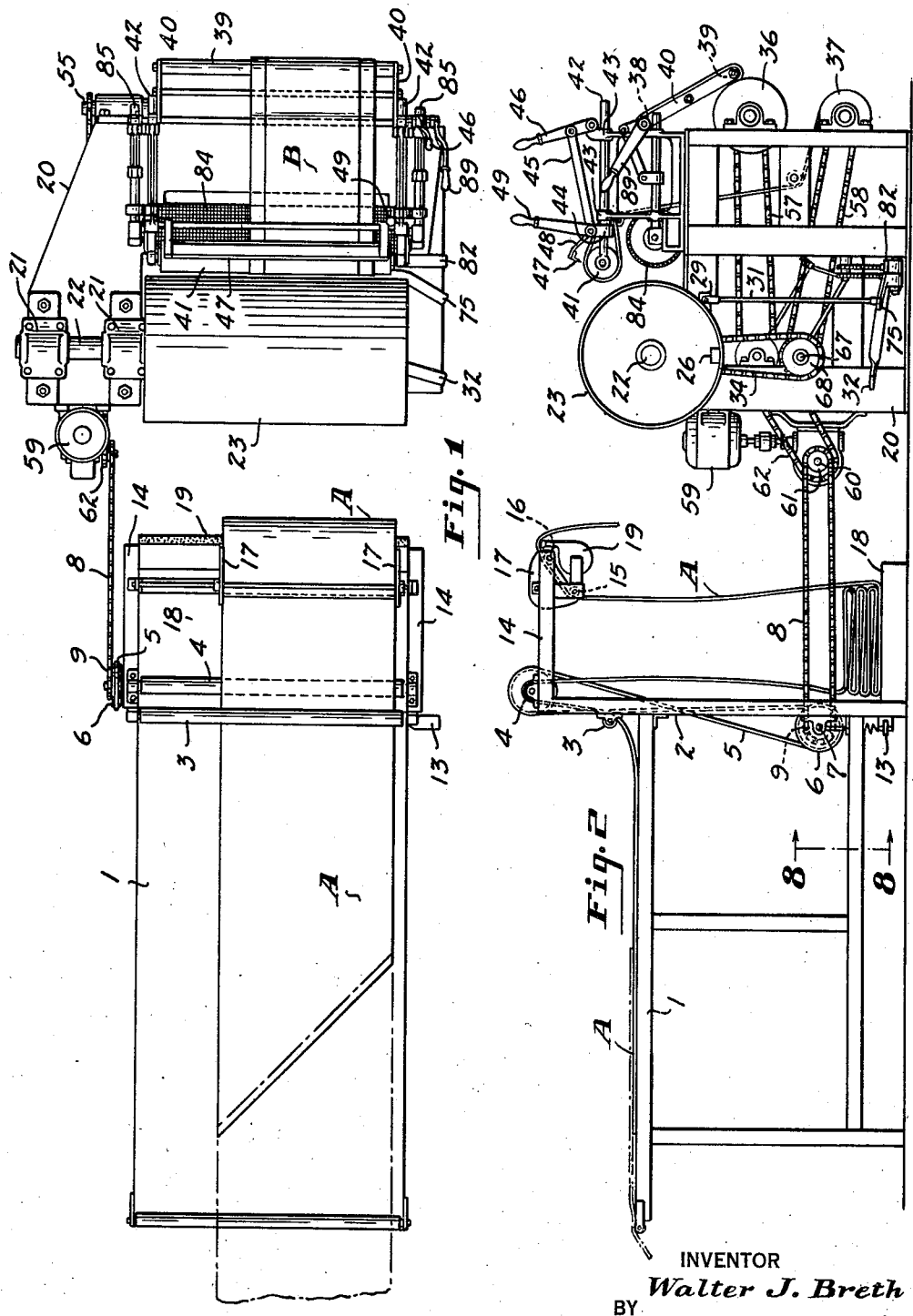
INVENTOR
Walter J. Breth
BY Evans & McCoy
ATTORNEYS Sept. 15, 1942.                W. J. BRETH                2,295,541
                    APPARATUS FOR FORMING FABRIC BANDS
                        Filed July 6, 1938         5 Sheets-Sheet 2
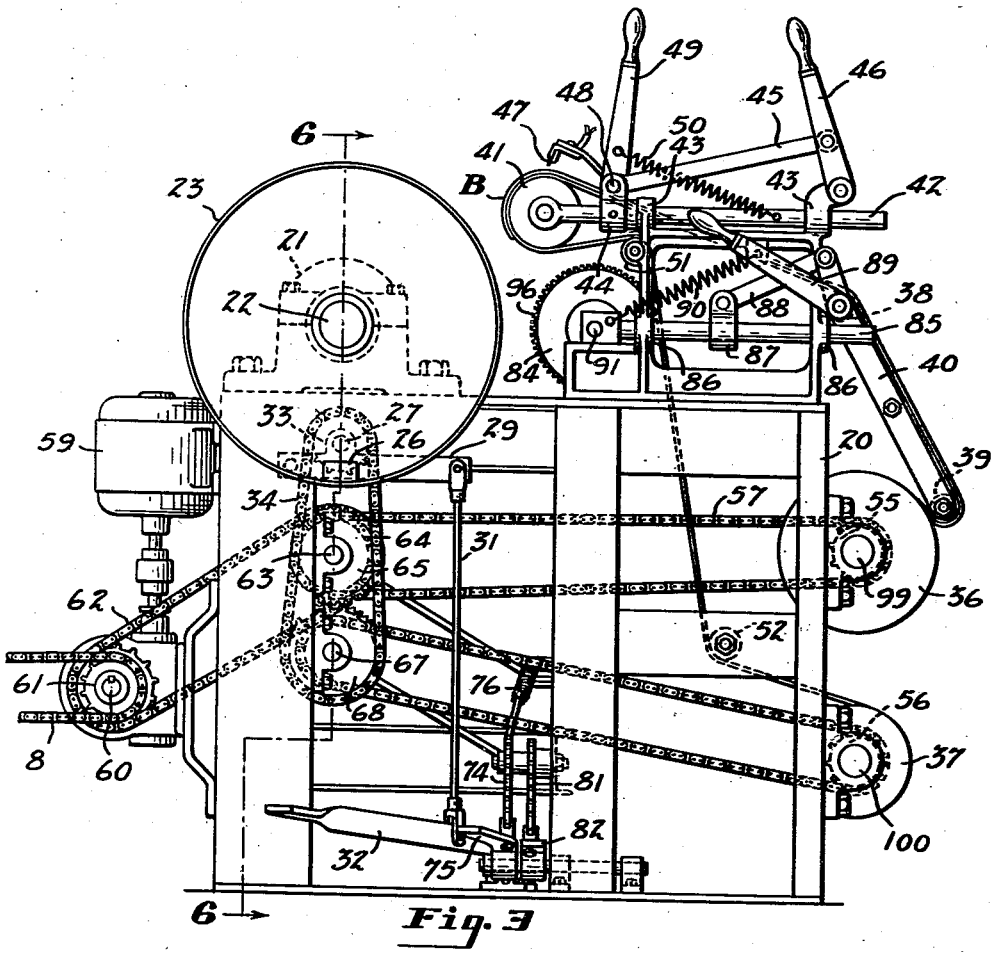
Fig. 3
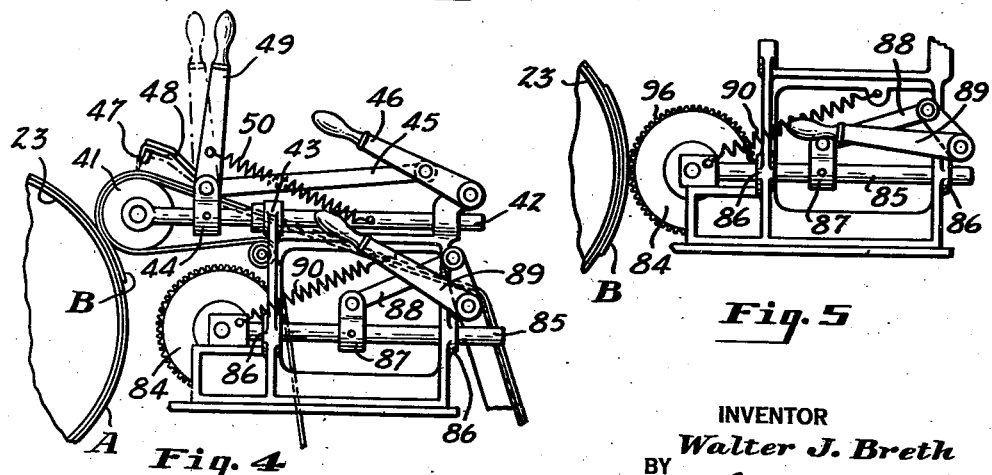
Fig. 4
Fig. 5
INVENTOR
Walter J. Breth
BY Evans + McCoy
ATTORNEYS Sept. 15, 1942.　　　　W. J. BRETH　　　　2,295,541
APPARATUS FOR FORMING FABRIC BANDS
Filed July 6, 1938　　　5 Sheets-Sheet 3

INVENTOR
Walter J. Breth
BY Evans & McCoy
ATTORNEYS

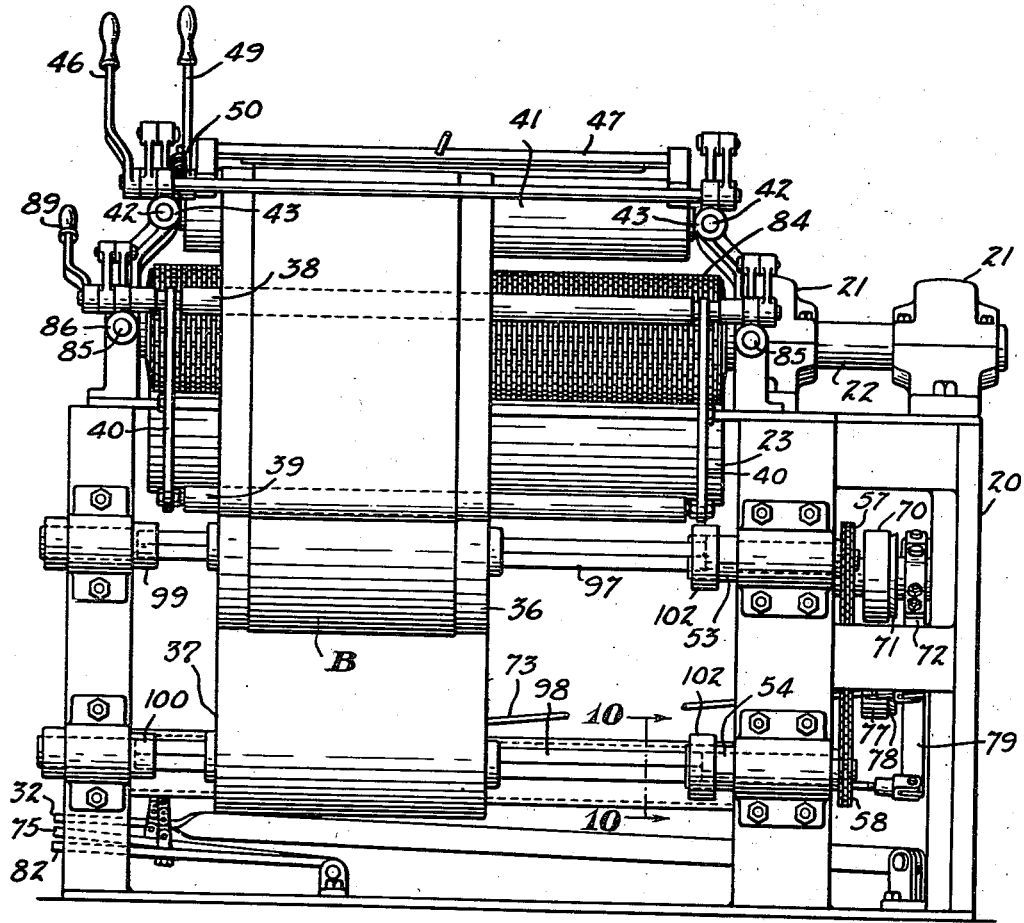
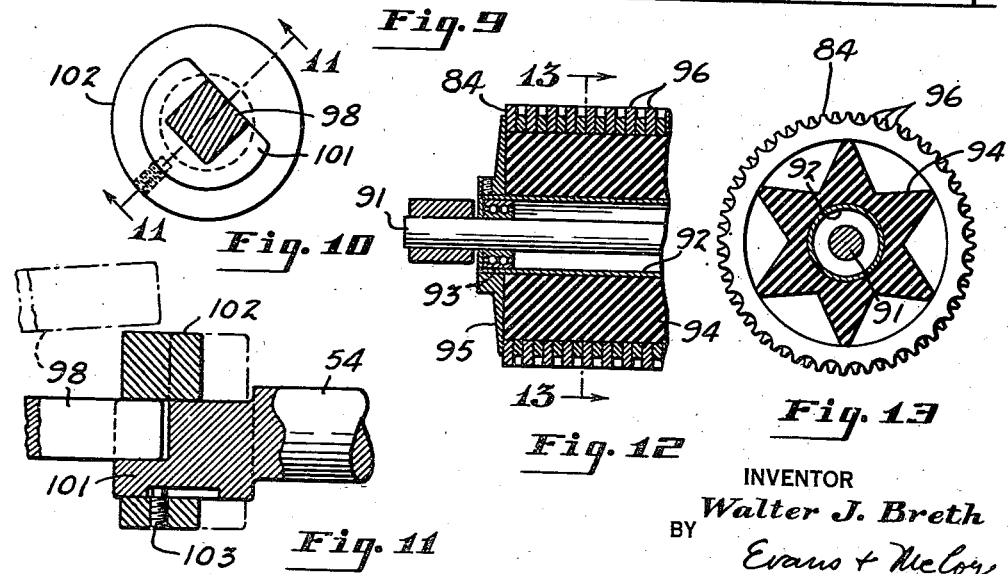

Sept. 15, 1942.  W. J. BRETH  2,295,541
APPARATUS FOR FORMING FABRIC BANDS
Filed July 6, 1938  5 Sheets-Sheet 5

INVENTOR
Walter J. Breth
BY Evans & McCoy
ATTORNEYS

Patented Sept. 15, 1942

2,295,541

UNITED STATES PATENT OFFICE 2,295,541

APPARATUS FOR FORMING FABRIC BANDS

Walter J. Breth, Akron, Ohio, assignor to The General Tire & Rubber Company, Akron, Ohio, a corporation of Ohio Application July 6, 1938, Serial No. 217,708

9 Claims. (Cl. 154—10)

This invention relates to a method of and apparatus for forming fabric bands that are adapted to form the inner plies of pneumatic cord tires.

In the building of pneumatic cord tire casings it is customary to apply a plurality of layers of fabric to a drum, apply the bead rings to the fabric band so formed, wrapping the edges of the band about the bead rings and then applying additional plies to the inner plies on the bead rings.

A tire factory requires a large number of tire building machines each adapted to build a tire of a certain size. The tire building operation particularly the application of the first layers of fabric to the drum, is a relatively slow and laborious one.

It is an object of the present invention to increase the output of the tire building machines by forming base bands of fabric and rubber independently of the tire building machine, which are adapted to be placed upon the drums of the tire building machines and to receive the bead rings so that the operation on the tire building machines begins with the application of the beads to a previously formed band.

It is an object of the present invention to provide means by which the band forming operation can be performed with much greater rapidity than on a tire building machine.

A further object is to provide a band forming device by means of which bands of various circumferences for use in building tires of various diameters may be made.

With the above and other objects in view, the invention may be said to comprise the method and apparatus illustrated in the accompanying drawings hereinafter described and particularly set forth in the appended claims, together with such variations and modifications thereof as will be apparent to one skilled in the art to which the invention appertains. Reference should be had to the accompanying drawings forming a part of the specification in which:

Fig. 1 is a top plan view of a band forming machine embodying the invention;

Fig. 2 is a side elevation of the machine;

Fig. 3 is a side elevation of the drum upon which the bands are formed together with the rubber feeding device and pressure applying roller;

Fig. 4 is a fragmentary side elevation showing the rubber feed device positioned to apply a strip of sheet rubber to a fabric band on the drum;

Fig. 5 is a fragmentary side elevation showing the pressure roller in engagement with a band carried by the drum;

Fig. 9 is a rear elevation of the machine showing the rubber stock feeding device and the pressure roller;

Fig. 10 is a section taken on the line indicated at 10—10 in Fig. 9;

Fig. 11 is a section taken on the line indicated at 11—11 in Fig. 10;

Fig. 12 is a fragmentary axial section showing an end portion of the pressure roller;

Fig. 13 is a section taken on the line indicated at 13—13 in Fig. 12;

Fig. 14 is a top plan view of the drum with the forward edge of a fabric strip applied to the drum;

Fig. 15 is a side elevation of the drum and strip in the positions shown in Fig. 14;

Figs. 16 and 17 are a top plan view and side elevation, respectively, showing the drum and strip with the strip partially wound on the drum;

Figs. 18 and 19 are a top plan view and side elevation, respectively, of the drum with the fabric band thereon after a measured length has been severed from the continuous strip and the ends thereof joined together;

Fig. 20 is a side elevation showing the application of a sheet rubber strip, known as squeegee stock, to the band;

Fig. 21 is a top plan view showing the application of a second layer of fabric;

Fig. 22 is a side elevation showing the application of the second fabric layer to the band; and Fig. 23 is a plan view of the completed band on the drum.

Figure 6:
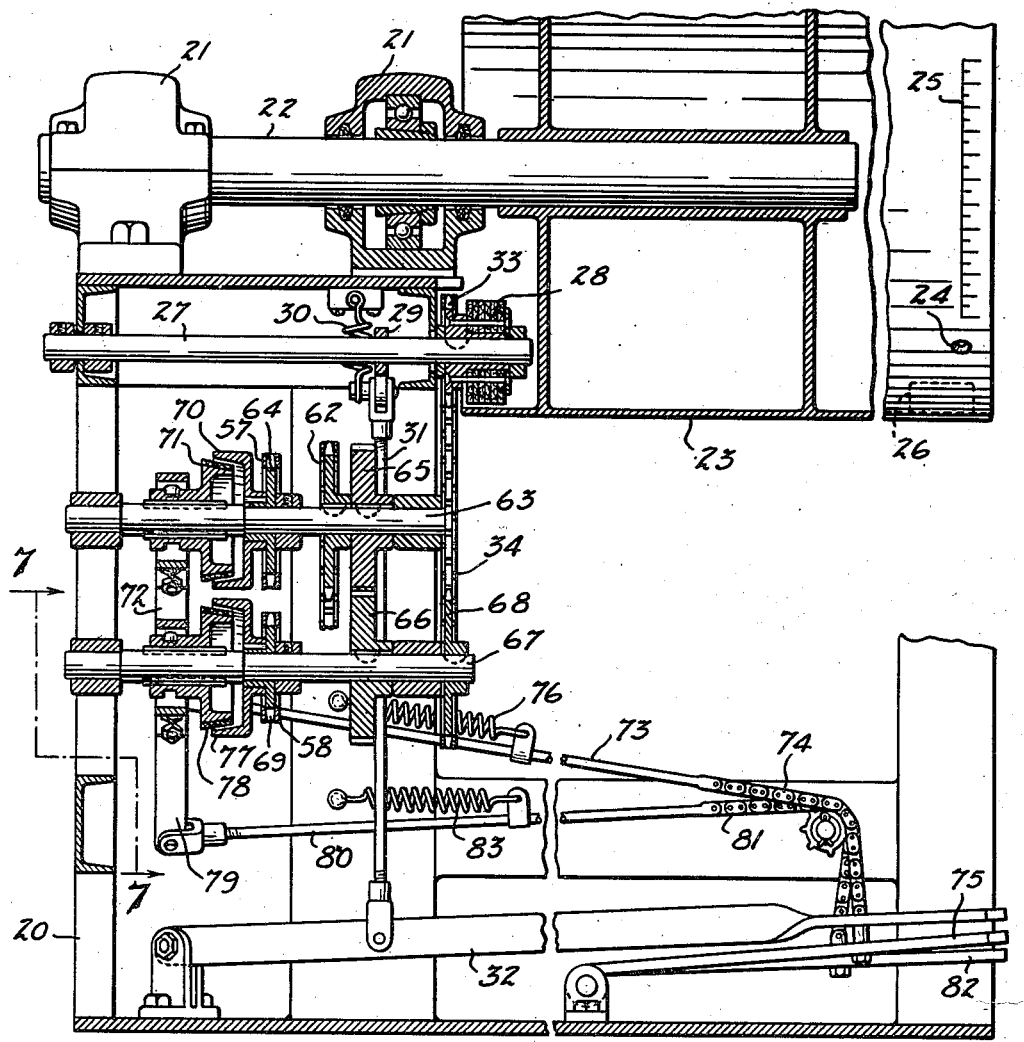
Fig. 6 is an enlarged section taken on the line indicated at 6—6 in Fig. 3.

Referring to the drawings, pieces of bias cut cord fabric are first joined together end to end to form a continuous strip A which is used in forming the bands.

Figure 8:
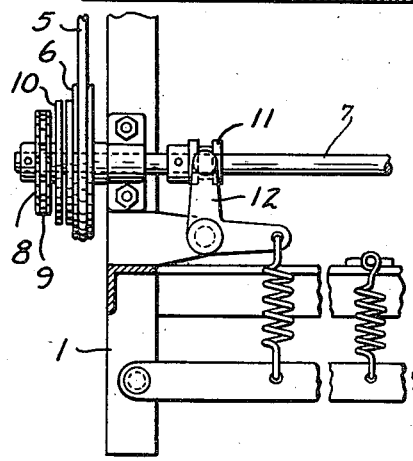
Fig. 8 is an enlarged section taken on the line indicated at 8—8 in Fig. 2 showing the clutch for controlling the strip feeding roller.
Figure 7:
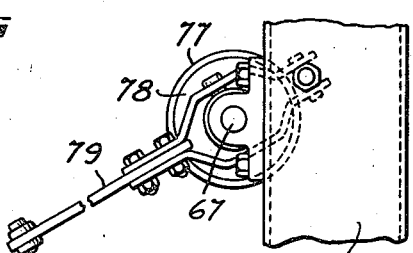
Fig. 7 is a side elevation of the drum clutch viewed as indicated by the arrow 7—7 in Fig. 6.

As shown in Figs. 1 and 2 of the drawings, a table 1 is provided which is of a size convenient for supporting the ends of bias cut pieces of rubberized cord fabric which are joined by overlapping the ends of successive pieces of fabric and pressing them together upon the surface of the table to form a continuous strip A. At the rear end of the table standards 2 are provided upon which are mounted a guide roller 3 and feed roller 4. The feed roller 4 is driven by means of a belt 5 from a pulley 6 below the roller 4. As best shown in Fig. 8, the pulley 6 is rotatably mounted upon a transverse shaft 7 which is driven by means of a chain 8 and sprocket 9. The sprocket 9 carries a disk 10 and is shiftable into engagement with the pulley 6 to make a frictional driving connection. For shifting the sprocket 9 and clutch disk 10, the shaft 7 has a grooved collar 11 attached thereto which is engaged by shifter lever 12 connected to a treadle 13. Whenever it is desired to drive the feed roller 4 the operator steps upon the tread 13 to press the disk 10 against the pulley 6. As long as pressure is maintained, the feed roller 4 will be driven and when the pressure is released the driving connection is broken.

At the beginning of the strip forming operation the operator places an end of a piece of bias cut fabric under the guide roller 3 and over the top of the feed roller 4 and operates the feed roller 4 to bring the trailing bias cut end of the piece of fabric to a convenient point on the table 1. An end of a second piece of bias cut fabric is then overlapped with the end of the first and joined thereto by pressing the ends together, the unvulcanized rubber of the fabric being sufficiently tacky to permit of joining in this manner. After joining a piece of fabric to the strip the operator again steps on the treadle 13 to advance the strip until the rear end of the strip is in position for receiving another length of bias cut fabric.

Rearwardly extending arms 14 are fastened to the upper ends of the standards 2 and support guide rollers 15 and 16 spaced rearwardly of the roller 4 over which the fabric strip may be drawn. Laterally adjustable guides 17 are supported on the arms 14 above the guide bars 15 and 16 for engagement with opposite edges of the fabric strip. The guides 17 may be adjusted to accommodate different widths of fabric and to adjust the strip laterally on the roller 4. Beneath the space between the feed roller 4 and the guide rollers 15 and 16 there is a platform 18 adjacent the floor upon which the loop of fabric between the feed roller 4 and the rollers 15 and 16 settles as the length of the strip A increases and upon which the strip material may accumulate in a pile as shown in Fig. 2 from which the fabric may be taken as desired over the guide bars 15 and 16 for the formation of fabric bands. The arms 14 also carry a solvent-applying device 19 which may be in the form of a container for solvent having a wick which wipes against the under side of the strip A and applies a coating of rubber solvent to the under face of the fabric strip throughout its width to increase the adhesiveness of that face so that superposed plies of fabric may be firmly united.

A short distance to the rear of the rear end of the table 1 there is mounted a frame 20 which supports the apparatus employed in forming the fabric bands. A pair of axially aligned ball bearings 21 are mounted upon the top of the frame 20 and rotatably support one end of a transverse shaft 22 which projects laterally from one side of the portion of the frame 20 upon which the bearings 21 are mounted and carries a drum 23 upon which the fabric bands are formed. The diameter of the drum 23 is somewhat less than that of the smallest band to be formed thereon, and is provided with means for measuring the length of strips to be used in forming the bands. As best shown in Fig. 6 the drum 23 has a measuring scale 25 marked on its periphery near one edge thereof and adjacent one end of the scale there is a finger depression 24 formed in the drum. At the beginning of the band forming operation the operator places the tip of the bias cut end of the strip A in the depression 24 and holds it there while he turns the drum 23 by hand in a counterclockwise direction as viewed in Figs. 2, 3 and 15 to draw the strip first under and then over the top of the drum so that the solvent coated side of the fabric is on the outside. He then measures the desired length of material in excess of the circumference of the drum by means of the scale 25, severs the strip diagonally between parallel cords and secures the ends of the severed strip together upon the top surface of the drum 23. The drum 23 is provided with an eccentric weight 26 so that the drum normally returns by gravity to the position shown in Fig. 6 of the drawings which is the proper position for starting the fabric on the drum.

In the application of layers of additional fabric to the exterior surface of the fabric band initially formed on the drum and for other operations the drum is power driven. For driving the drum a vertically adjustable shaft 27 is mounted in the frame 20 beneath the shaft 22 and this shaft carries a friction wheel 28 which is engageable with the interior of the drum when the shaft 27 is moved downwardly. The shaft 27 is supported by a lever 29 pivoted to the frame to which is connected a spring 30 hung from the frame 20 which serves to normally hold the shaft in its elevated position with the friction wheel 28 out of engagement with the drum. A connecting rod 31 is pivotally connected at its upper end to the lever 29 and at its lower end to a treadle lever 32. When it is desired to drive the drum by means of the friction wheel 28 the operator steps on the treadle lever 32 holding the lever 32 down to maintain driving engagement between the friction wheel 28 and the drum. The friction wheel 28 has a sprocket 33 attached thereto which is driven by means of a sprocket chain 34.

Means is provided for supplying unvulcanized sheet rubber squeegee stock to a fabric band on the drum 23. At the rear end of the frame 20 a reel 36 is mounted which has squeegee stock backed with liner fabric wound thereon. Below the reel 36 there is mounted a reel 37 upon which the liner strip may be wound as the rubber stock is delivered to the drum. On the frame 20 above the reel 36 there is mounted a guide roller 38 and a roller 39 is mounted upon the ends of arms 40 which are pivoted to swing about the axis of the roller 38. The arms 40 have a length such that the roller 39 may rest on the rubber stock carried by the reel, the stock passes under the roller 39 and over the roller 38 to a roller 41 by means of which the stock is applied to the material on the drum. The roller 41 is mounted for movement horizontally into and out of drum-engaging position, being journalled in the forward end of parallel bars 42 which are mounted to slide in bearings 43 on the frame 20. Brackets 44 are fixed to the bars 42 forwardly of the front bearings 43 and these brackets are connected by links 45 to arms of a lever 46 pivoted in the rear end of the frame. The squeegee stock is fed from the reel 36 over the rollers 39 and 38, over the top of the roller 41 and is transferred to the fabric on the drum 23 as it passes over the roller 41, the fabric liner being carried from the under side of the roller 41 to the wind-up reel 37. In order to sever the squeegee stock after a desired length thereof has been applied to the band on the drum a knife 47 is provided which is carried by a rock shaft 48 journalled in the brackets 44 and operated by means of a lever 49 fixed to the shaft. The knife 47 extends parallel with the roller 41 so that it can be swung down into engagement with the rubber on the roller. The knife 47 is preferably an electrically heated knife which softens the rubber with which its edge contacts, so that the rubber stock can be severed without damage to the fabric liner beneath it. A spring 50 attached to the lever 49 normally holds the knife 47 in elevated position out of contact with the squeegee stock. The fabric liner is guided by rollers 51 and 52 journalled in the frame 20 to the wind-up reel 37. The reels 36 and 37 are keyed to shaft 53 and 54 which carry sprockets 55 and 56 which are driven by chains 57 and 58.

All of the power operated parts of the apparatus are driven by a motor 59 mounted on the frame 20. The motor 59 drives a countershaft 60 to which is affixed a sprocket 61 which drives the chain 8 through which power is applied to the strip feed roller 4 at the rear end of the splicing table. The countershaft 60 also drives a sprocket chain 62 which drives a countershaft 63 at the rear of the countershaft 60. Shaft 63 carries a sprocket 64 which drives the sprocket chain 57 through which the stock reel 36 is driven. A gear 65 fixed to the shaft 63 meshes with a gear 66 fixed to a shaft 67 journalled in the frame beneath the shaft 63. Shaft 67 carries a sprocket 68 which drives the chain 34 through which the drum 23 is driven, and also a sprocket 69 which drives the chain 58 which operates the fabric liner wind-up reel 37. The sprockets 64 and 69 are rotatable on the shafts 63 and 67 and are driven from the shafts by means of clutches. The sprocket 64 carries a cone clutch element 70 with which a cone clutch element 71 slidably keyed to the shaft 63 may be engaged. The sliding clutch element 71 is operated by a shifter lever 72 which is connected by means of an operating rod 73 and chain 74 to a treadle 75. A spring 76 attached at one end of the rod 73 and at the other to the frame 20 normally holds the clutch element 71 in disengaged position. The sprocket 69 carries a cone clutch element 77 with which a sliding cone clutch element 78 keyed to the shaft 67 may be engaged. The sliding clutch element 78 is operated by means of a shifter lever 79 connected by means of a rod 80 and chain 81 to a treadle 82. A coil spring 83 connected at one end to the frame and at the other to the rod 80 normally holds the sliding clutch 78 out of engagement with the clutch element 77. Each of the reels 36 and 37 is driven in the wind-up direction only. The feed of squeegee stock to the drum is normally effected by operating the fabric wind-up reel 37. The drive for the stock reel 36 is provided to permit of quick adjustment of the position of the stock on the roller 41 and to return the squeegee stock unwound from the reel 36 to the reel whenever operation of the machine is discontinued.

In order to firmly unite superposed layers of fabric or of squeegee stock and fabric on the drum 23 a pressure roller 84 is provided beneath the roller 41. The roller 84 is journalled in the forward end of parallel horizontal bars 85 which are slidably mounted in bearings 86 carried by the frame. Brackets 87 are attached to the bars 85 and are connected by links 88 to a lever 89 consisting of a cross shaft having arms attached to the links and an extending hand operated portion. Springs 90, connected at one end to the forward ends of the bars 85 and at the other to the frame, may be provided to normally hold the pressure roller 84 in retracted position. The pressure roller is formed with a yielding peripheral portion which conforms to the surface with which it engages in order to uniformly apply pressure to the stock on the drum.

As best shown in Figs. 12 and 13, the roller 84 is carried by a shaft 91 on which is rotatably mounted a metal tube 92 forming the core of the roller, ball bearings 93 being interposed between the tube and the shaft. The tube 92 carries a rubber core 94 of star shaped cross-section held in place by end plate 95 secured to the tube 92 and upon the rubber core is mounted the peripheral portion of the roller consisting of a series of flat disk-like toothed rings 96. The rings 96 are individually yieldingly supported on the circumferentially spaced tips of the star shaped rubber core. The disk-like rings 96 are placed side by side with their flat side faces in contact throughout the length of the roller. The rings 96 are loosely held by the end plates 95 so that pressure upon individual rings 96 may cause them to shift radially one independently of another so that during operation the peripheral surface formed by the teeth of the disk will conform to the surface of the band on the drum 23.

The reels 36 and 37 are provided with square shafts 97 and 98 which project upon opposite sides of the reels. The ends of the square shafts 97 and 98 fit in square sockets in the inner ends of shafts 99 and 100 which are journalled in the frame in axial alignment with the shafts 53 and 54 which drive the reels. Each of the shafts 53 and 54 is provided with a square socket 101 open at one side and adapted to receive a square reel shaft and each shaft has a sliding collar 102 movable from a position clear of the socket 101 to a position over the socket where it serves to lock the square shaft in the socket. A set screw 103 may be provided to retain the collar in locking position.

In the operation of the machine, one operator may work at the splicing table forming the continuous strip A used in making the bands, while another operator forms the bands on the drum 23 drawing the fabric strip as needed from the support 18 upon which the strip is piled. If desired, an operator may first work at the splicing table forming a suitable length of fabric strip material and then go to the drum and build bands from this strip material. At the splicing table the operator joins a length of bias cut fabric to the strip operating the feed roller 4 after each splicing operation by means of the treadle 13. As soon as sufficient length of strip is formed the forward ends thereof are placed over the guide bars 15 and 16 so that the strip stock will pile up on the support 18 as pieces of fabric are added to the strip.

Figure 14:
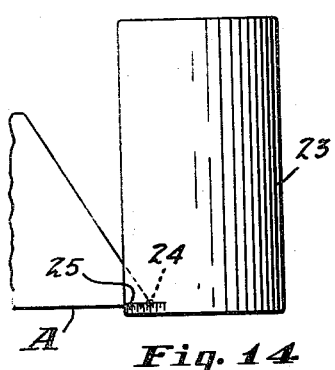
Figs. 14 to 23 illustrate the method of forming the band.
Figure 16:
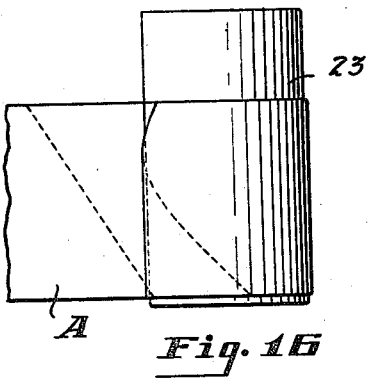
Figure 18:
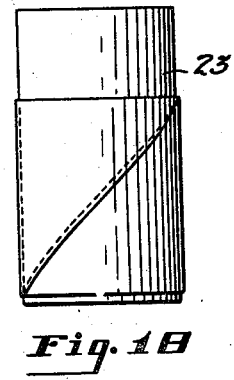
Figure 15:
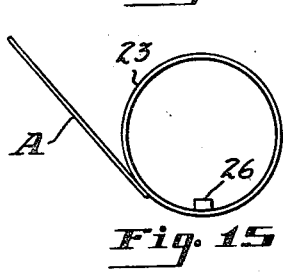
Figure 17:
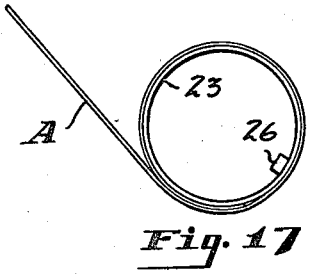
Figure 19:
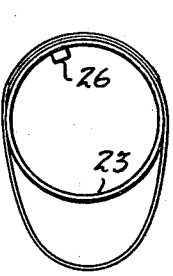
Figure 20:
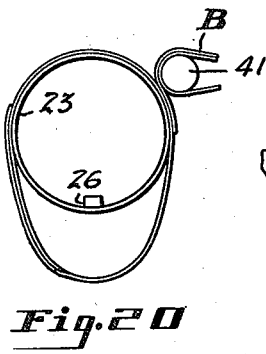
Figure 21:
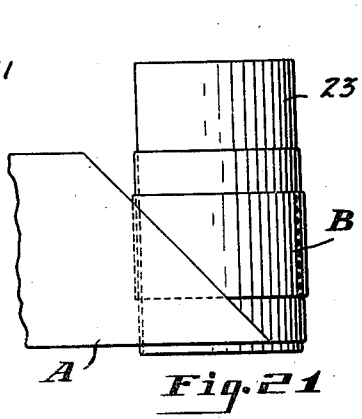

In connection with the band forming operations performed on the drum 23 reference should be had to Figs. 14 to 22 of the drawings. At the beginning of the operation the operator grasps the end of the fabric strip A depending from the supporting arms 14 and pulls the strip forwardly. As the strip moves over the solvent-applying wick 19 the under side of the strip receives a coating of rubber solvent. The operator then places the tip of the bias cut end of the strip in the finger recess 24 on the drum as shown in Figs. 14 and 15 and turns the drum in a counterclockwise direction as indicated in Figs. 16 and 17 to wind the fabric strip around the under side of the drum. The drum is turned through somewhat more than a complete revolution so that the operator may measure by means of the scale 25 the proper length of fabric to form a band of the desired diameter. The portion of the strip A between the drum and the strip supporting arms 14 is then swung over to the proper point on the scale 25 and at the point indicated the strip is severed by tearing the same apart along the line between parallel cords. The operator then applies the ends of the fabric together in over-lapping relation on the surface of the drum as shown in Fig. 18, forming a fabric band of a circumference substantially greater than that of the drum 23 as shown in Fig. 19. The size of the band formed is of proper diameter to fit upon a tire building drum for a given tire and may be made to fit any of the sizes of drums employed. The drum 23 is properly positioned for the strip measuring operation by means of the eccentric weight 26 which always returns the drum to the position shown in Fig. 15. After the first layer of fabric has been joined together to form an endless band, a strip of squeegee stock B may be applied by shifting the roller 41 forwardly by means of the lever 46 and operating the reel 37 by depressing the treadle 82. Drum 23 may be rotated by the roller 41 until the desired length of squeegee stock has been applied to the band on the drum, whereupon the liner reel clutch is disconnected by releasing the treadle 82 and the lever 49 is then operated to sever the squeegee stock on the roller 41. After the application of the squeegee stock the layers may be compacted by pressing the roller 84 into engagement with the material on the drum and operating the treadle 32 to impart rotation to the drum.

Figure 23:
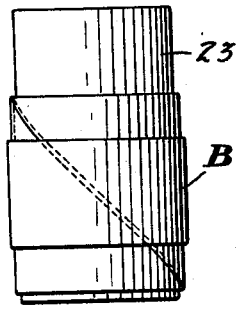
Figure 22:
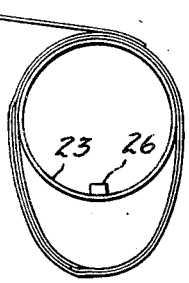

The first layer of fabric is applied with the sticky side out but in applying the second length of fabric to form the second fabric ply of the band the drum is power driven in a clockwise direction as viewed in Fig. 22 and the fabric strip is drawn over the top of the drum so that its sticky side is applied to the material on the drum. After the leading edge of the fabric strip is applied to the material on the top of the drum the treadle 32 is operated to rotate the drum until the leading edge of the strip is brought to the top of the drum beneath the incoming fabric, whereupon the strip is severed and the ends of the second layer of fabric united as shown in Fig. 23. A second layer of squeegee stock may be applied and the material of the band is compacted by means of the pressure roller 84. The resulting band is then taken off the drum 23 and delivered to the tire building machine where the bead rings may be applied together with additional fabric plies to form a tire casing.

By reducing the number of operations required on the individual tire building machines the rate of production of a given number of machines can be considerably increased. Furthermore, with the machine of the present invention, one or two operators can supply the base bands for a large number of tire building machines, which, by reason of the mechanism required for applying beads and other operations, are not well adapted for rapid forming of the initial plies.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A machine for building base bands for use in making cord tire casings, comprising means for supporting a continuous single ply cord fabric strip and guiding the endwise movement of the strip, a supporting frame, a band measuring and building drum carried by the support and projecting laterally therefrom across the path of endwise movement of the strip, said drum being mounted to rotate freely in either direction whereby successive layers of fabric may be wound oppositely thereon, the outer end of the drum being unobstructed to permit removal of a band formed on the drum, a driving mechanism, manually controlled means for connecting said driving mechanism to the drum to rotate the drum with a band thereon, and a pressure roller mounted for movement into pressing engagement with the band on the drum to press layers of the band together while the drum is being driven.

2. A machine for building base bands for use in making cord tire casings, comprising means for supporting a continuous single ply cord fabric strip and guiding the endwise movement of the strip, a supporting frame, a band measuring and building drum carried by the support and projecting laterally therefrom across the path of endwise movement of the strip, said drum being mounted to rotate freely in either direction whereby successive layers of fabric may be wound oppositely thereon, the outer end of the drum being unobstructed to permit removal of a band formed on the drum, a driving mechanism, manually controlled means for connecting said driving mechanism to the drum to rotate the drum with a band thereon, means for feeding sheet rubber to the drum, and a pressure roller mounted for movement into pressing engagement with the layers of fabric and rubber on the drum to press the layers of fabric and rubber together.

3. A machine for building base bands for use in making pneumatic tire casings comprising a table upon which bias cut strips of cord fabric may be joined into a continuous single ply strip, intermittently operable strip advancing means carried by the table, strip guiding means to which the strip passes from the strip advancing means, means intermediate the strip advancing and strip guiding means for supporting an accumulation of the strip material, a drum in advance of the said strip guiding means upon which the strip material may be wound, measured and spliced to form a band, said drum being mounted to rotate freely in either direction, driving means for said drum, means for disengaging said driving means from the drum to permit the drum to be turned manually and for engaging said driving means with said drum, and a pressure applying roller engageable with a band on the drum.

4. A machine for building base bands for use in making cord tire casings, comprising means for supporting a continuous single ply cord fabric strip and guiding the endwise movement of the strip, a supporting frame, a band measuring and building drum carried by the support and projecting laterally therefrom across the path of endwise movement of the strip, said drum being mounted to rotate freely in either direction whereby successive layers of fabric may be wound oppositely thereon, the outer end of the drum being unobstructed to permit removal of a band formed on the drum, means for applying rubber solvent to one face of the fabric strip as it is fed to the drum, a driving mechanism, manually controlled means for connecting said driving mechanism to the drum to rotate the drum with a band thereon, and a pressure roller mounted for movement into pressing engagement with the band on the drum to press layers of the band together while the drum is being driven.

5. A machine for building base bands for use in making tire casings comprising a table providing a support upon which bias cut lengths of cord fabric may be joined end to end to provide a continuous single ply fabric strip, means carried by the table for advancing the fabric strip, manually operable means for controlling said strip advancing means, strip guiding means spaced from said strip advancing means, means between the strip advancing and guiding means for supporting an accumulation of strip material, and a band measuring and building drum spaced from said strip guiding means upon which the fabric strip may be wound, measured and spliced to form a band, said drum being rotatable in either direction whereby successive fabric layers may be oppositely wound on the drum.

6. A machine for building base bands for use in making tire casings comprising a table providing a support upon which bias cut lengths of cord fabric may be joined end to end to provide a continuous single ply fabric strip, means carried by the table for advancing the fabric strip, manually operable means for controlling said strip advancing means, strip guiding means spaced from said strip advancing means, means between the strip advancing and guiding means for supporting an accumulation of strip material, a band measuring and building drum spaced from said strip guiding means and rotatable in either direction, whereby successive layers of fabric may be oppositely wound on the drum, means for driving the drum, manually operable means for controlling said drum driving means, and a pressure roller mounted for movement into or out of engagement with a band on the drum.

7. A machine for building base bands for use in making tire casings comprising a table providing a support upon which bias cut lengths of cord fabric may be joined end to end to provide a continuous single ply fabric strip, means carried by the table for advancing the fabric strip, manually operable means for controlling said strip advancing means, strip guiding means spaced from said strip advancing means, means between the strip advancing and guiding means for supporting an accumulation of strip material, a band measuring and building drum spaced from said strip guiding means and rotatable in either direction whereby successive layers of fabric may be wound on the drum, means for driving the drum, manually operable means for controlling said drum driving means, means for feeding squeegee stock to a fabric band on said drum, and a pressure roller mounted for movement into and out of engagement with a band on the drum to press the layers of fabric and rubber together.

8. A machine for building base bands for use in making cord tire casings comprising a frame, a band measuring and building drum supported at one end in said frame and mounted to rotate freely in either direction, a friction roller mounted in said frame for movement bodily toward and away from the axis of the drum and positioned within said drum, means for driving said roller, means for moving the roller into engagement with the interior of the drum to drive the drum into and out of engagement with the drum to permit the drum to be turned manually, means at one side of the drum for supporting and guiding a continuous strip of cord fabric to the drum, and a pressure roller mounted for movement into engagement with a band on the drum.

9. A machine for building base bands for use in making cord tire casings comprising a rotatable band measuring and building drum, means at one side of the drum for supporting and guiding a strip of fabric to the drum, driving means for the drum, means for disconnecting the driving means to permit manual operation of the drum, means at the opposite side of the drum for feeding squeegee stock to the drum including a roller mounted for movement toward and away from the drum, manually operable means for shifting said roller, a pressure applying roller beneath said stock feeding roller mounted for movement into and out of engagement with the drum, and means for shifting said pressure applying roller and for pressing the same against the drum.

WALTER J. BRETH.